United States Patent
Kaneko et al.

[11] Patent Number: 5,822,075
[45] Date of Patent: Oct. 13, 1998

[54] IMAGE FORMING APPARATUS HAVING MULTIPLE SHEET STACKING UNITS

[75] Inventors: Satoshi Kaneko, Kawasaki; Hirokazu Takahashi, Yokohama; Satoru Kutsuwada, Kawasaki; Noriaki Matsui; Hiroyuki Kimura, both of Yokohama, all of Japan

[73] Assignee: Canon Kabushiki Kaisha, Tokyo, Japan

[21] Appl. No.: 489,132

[22] Filed: Jun. 9, 1995

[30] Foreign Application Priority Data

Jun. 10, 1994  [JP]  Japan ................................ 6-129134

[51] Int. Cl.⁶ .................................................. B65H 39/10
[52] U.S. Cl. .......................... 358/296; 358/486; 358/498; 399/405; 271/290
[58] Field of Search ..................................... 358/296, 400, 358/401, 486, 498; 399/45, 403–405, 407, 408; 271/287, 288, 290, 292, 298

[56] References Cited

U.S. PATENT DOCUMENTS

| | | | |
|---|---|---|---|
| 4,515,464 | 5/1985 | Shigemura et al. | 355/14 R |
| 5,328,169 | 7/1994 | Mandel | 271/290 |
| 5,528,361 | 6/1996 | Sakata | 358/296 |
| 5,580,045 | 12/1996 | Matsumoto et al. | 271/298 |
| 5,627,650 | 5/1997 | Nosaki et al. | 358/296 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An image forming apparatus is provided with a first sheet enclosing unit to enclose sheets in a first direction, a second sheet enclosing unit to enclose sheets in a second direction perpendicular to the first direction, an image forming unit to form an image onto the sheet fed from either one of the first and second sheet enclosing units, a sorter having a plurality of bins for enclosing the sheet on which the image was formed by the image forming unit, and a judging unit to judge an enclosing state of the sheet of each bin of the sorter. The image forming unit selects either one of the first and second sheet enclosing units on the basis of the result of the judgment of the judging unit and allows the selected sheet enclosing unit to feed the sheet.

12 Claims, 9 Drawing Sheets

IMAGE FORMING APPARATUS HAVING MULTIPLE SHEET STACKING UNITS

BACKGROUND OF THE INVENTION

1. Field of the Invention

The present invention relates to an image forming apparatus having a sorter with a plurality of bins each for enclosing a sheet on which an image is formed.

2. Related Background Art

Hitherto, a sorter having a plurality of bins can be connected to an image forming apparatus such as a copying machine, a facsimile apparatus, or the like. Since the sheet cannot be ejected to a designated bin of the sorter, however, an apparatus which can realize such an operation is desired.

In case of realizing such an apparatus, when the operator instructs to eject the sheets of a different group to the bin which was designated before and in which other sheets exist, bundles of sheets of different groups are stacked on the bins of a sorter as if they are a bundle of sheets of one group. Therefore, there is a fear that the operator takes away the desired sheets together with the other bundles of sheets. Even if the operator knew such a situation, there is a drawback such that it is troublesome to manually sort the sheets ejected to the same bin.

SUMMARY OF THE INVENTION

It is an object of the invention to provide an image forming apparatus which can solve the above-mentioned drawbacks.

Another object of the invention is to provide an image forming apparatus which can control so as to easily sort a plurality of groups of sheets in bins of a sorter.

The above and other objects and features of the present invention will become apparent from the following detailed description and the appended claims with reference to the accompanying drawings.

DETAILED DESCRIPTION OF THE PREFERRED EMBODIMENT

An embodiment of the present invention will now be described in detail hereinbelow.

Figure 1:
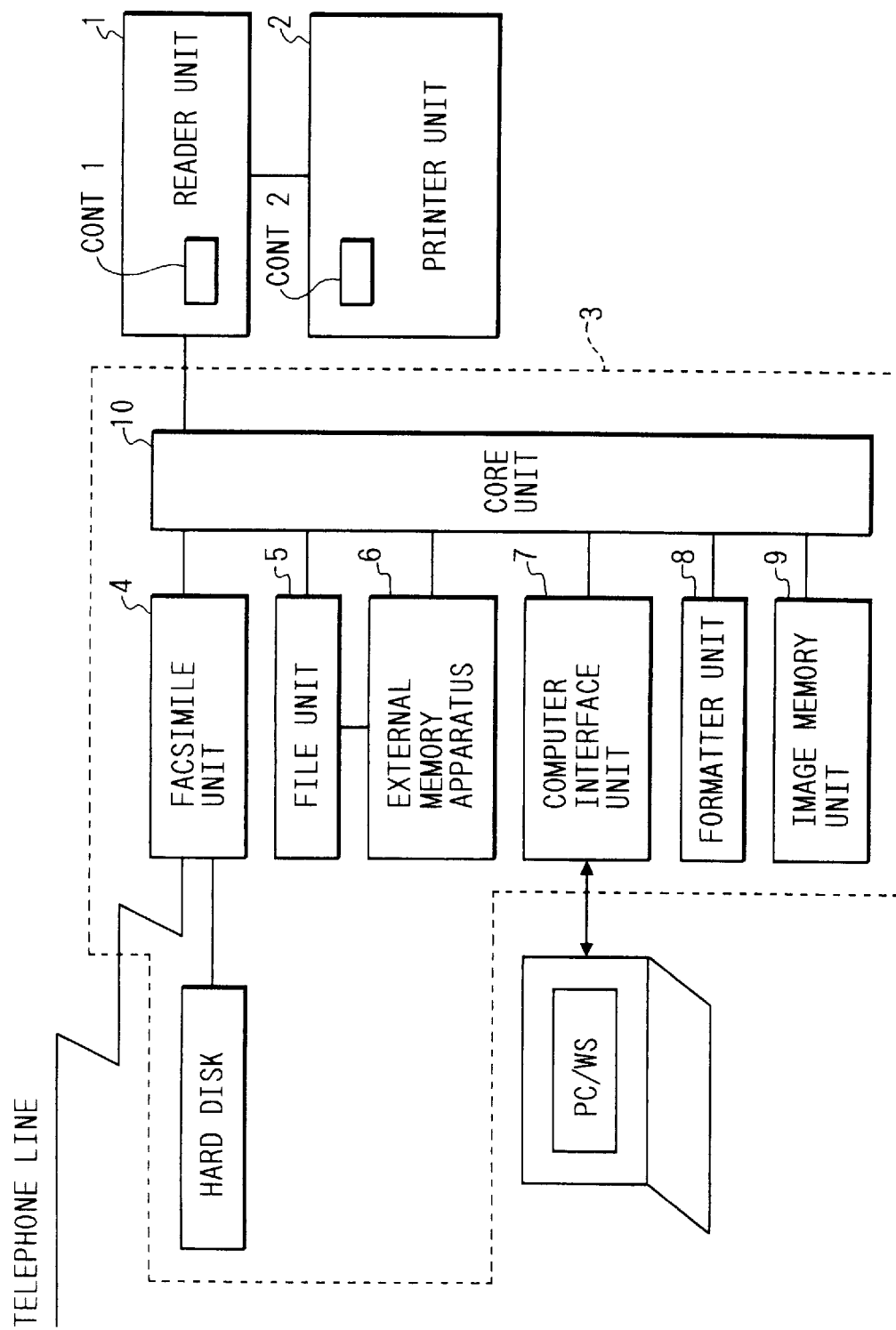
FIG. 1 is a block diagram of an embodiment.

FIG. 1 is a block diagram showing a construction of an image forming apparatus as an embodiment of the invention.

In FIG. 1, a reader unit 1 functions as first image input means and converts an original to image data. A printer unit 2 has cassettes of a plurality of kinds of recording papers for functioning as image output means and outputs the image data as a visible image to a recording paper by a printing command. An external apparatus 3 is electrically connected to the reader unit 1 and has various kinds of functions. The external apparatus 3 which functions as second image input means includes: a facsimile unit 4; a file unit 5; an external memory apparatus 6 connected to the file unit 5; a computer interface unit 7 to connect to a computer and an LAN; a formatter unit 8 to convert code information from the computer to image information; an image memory unit 9 to store information from the reader unit 1 and to temporarily store information from the computer; a core unit 10 to control the foregoing functions and processes; and the like. CONT1 denotes a reader control unit and CONT2 denotes a printer control unit. Each of them is constructed so that it can communicate with the core unit 10 of the external apparatus 3 and has a CPU, a ROM, a RAM, and the like.

Figure 2:
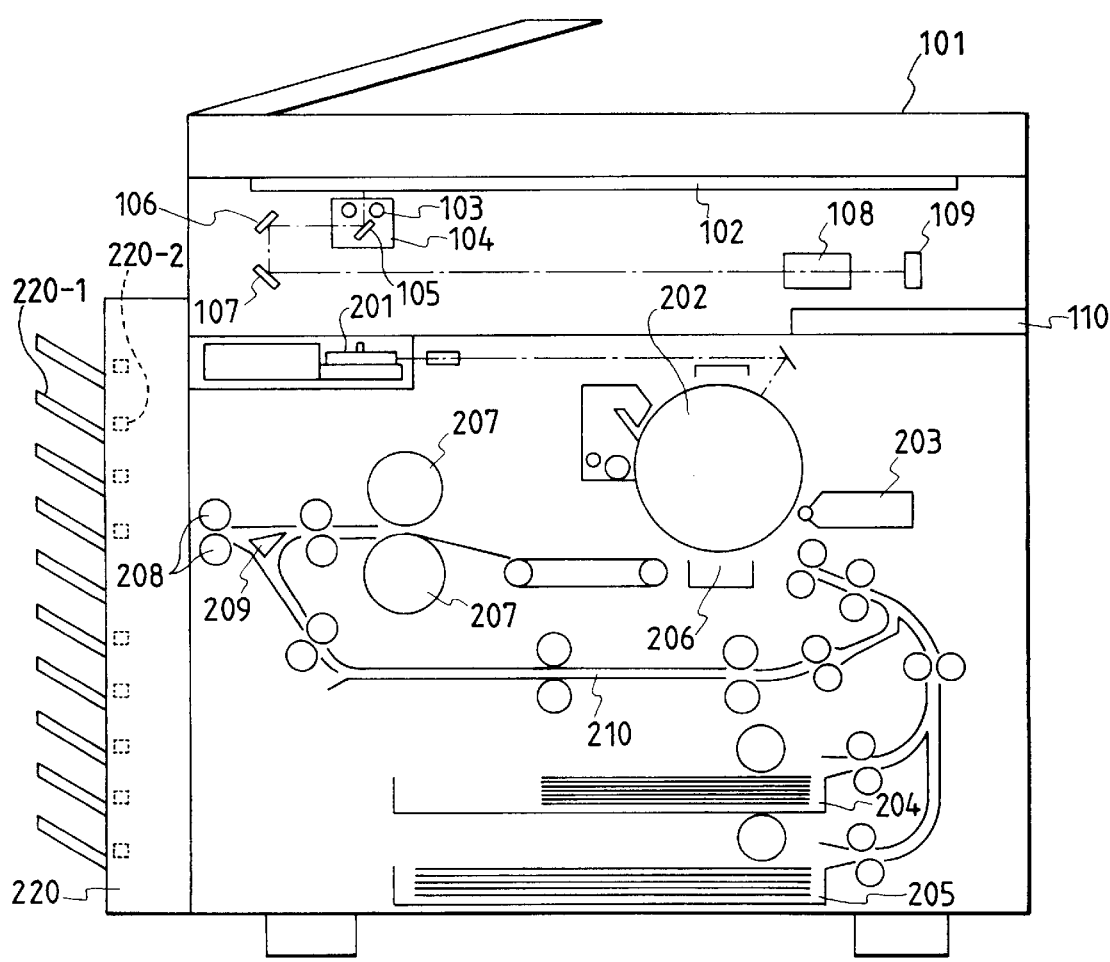
FIG. 2 is a diagram showing a construction of a reader unit and a printer unit in the embodiment.

FIG. 2 is a cross sectional view for explaining a construction of the reader unit 1 and printer unit 2 shown in FIG. 1. The construction and operation will now be described hereinbelow.

Originals stacked on an original feeding apparatus 101 are sequentially conveyed one by one onto an original holding glass plate surface 102 by the original feeding apparatus 101. When the original is conveyed to a predetermined position of the glass surface 102, a lamp 103 of a scanner unit 104 is lit on and the scanner unit 104 moves and irradiates the original. A reflected light from the original enters a CCD image sensor 109 (hereinbelow, referred to as a CCD) through mirrors 105, 106, and 107 and a lens 108.

In an image processing unit 110, image information inputted from the CCD 109 is subjected to image processes set by various kinds of operation units. The image processing unit 110 has an image memory and also has a function to rotate an image outputting direction. A rotating process of the image is similar to the process of the formatter unit 8.

An external switching circuit of the image processing unit 110 has a selector to switch the signal from the reader unit 1 to the printer unit 2 or external apparatus 3 and also has a function to select either one of the image information from the reader unit 1 and the image information from the external apparatus 3 and to connect to the printer unit 2.

The image information inputted to the printer unit 2 through the external switching circuit of the image processing unit 110 is converted to a photosignal modulated by an exposure control unit 201 and is irradiated to a photosensitive material 202. A latent image formed on the photosensitive material 202 by the irradiated light is developed by a developing device 203. A sheet is conveyed by a sheet stacking unit 204 or 205 by matching a timing with a front edge of such a latent image and the foregoing developed image is transferred onto the fed sheet by a transfer unit 206. The transferred image is fixed to the sheet by a fixing unit 207 and, after that, the sheet is ejected to the outside of the apparatus by a paper ejection unit 208. The sheet ejected from the paper ejection unit 208 is delivered to a bin 220-1 of a sorter 220. In this instance, when the ejection bin is designated, the sorter 220 is controlled so that the sheet is ejected to the designated ejection bin. The sorter 220 has a sheet detection sensor 220-2 for each ejection bin 220-1, so that whether the sheet has been ejected to each bin or not can be detected. The sorter 220 is constructed so as to count the number of sheets ejected to each bin 220-1 of the sorter 220 for every bin. A count value is reset to 0 in correspondence to that the detection result of the sheet detection sensor 220-2 was changed from the presence of the sheet to the absence of the sheet. The apparatus is further constructed in a manner such that which size of the sheets have been ejected to each bin 220-1 of the sorter 220 is stored for every bin.

A case where the image information which is sequentially read or inputted is printed to both sides of the sheet will now be described.

The sheet fixed by the fixing device 207 is once conveyed to the paper ejection unit 208 and, after that, the conveying direction of the sheet is reversed and the sheet is conveyed to a sheet stacking unit 210 for paper refeed through a conveying direction switching member 209. When the next original is prepared, the original image is read in a manner similar to the above-mentioned process and the original image is printed to the sheet fed by the sheet stacking unit 210 for paper refeed, so that two original images can be printed to the front and rear surfaces of the same sheet.

As shown in FIG. 1, the external apparatus 3 is connected to the reader unit 1 by a cable and the core unit 10 in the external apparatus 3 controls signals and functions. The external apparatus 3 has therein: the facsimile unit 4 for performing facsimile transmission and reception; the file unit 5 for preserving the original image information to a magneto-optical disk; the formatter unit 8 for developing code information from the computer to image information; the computer interface unit 7 for interfacing to the LAN and computer; the image memory unit 9 for storing information from the reader unit 1 and for temporarily storing information transmitted from the computer; and the core unit 10 for controlling the above-mentioned functions.

Figure 3:
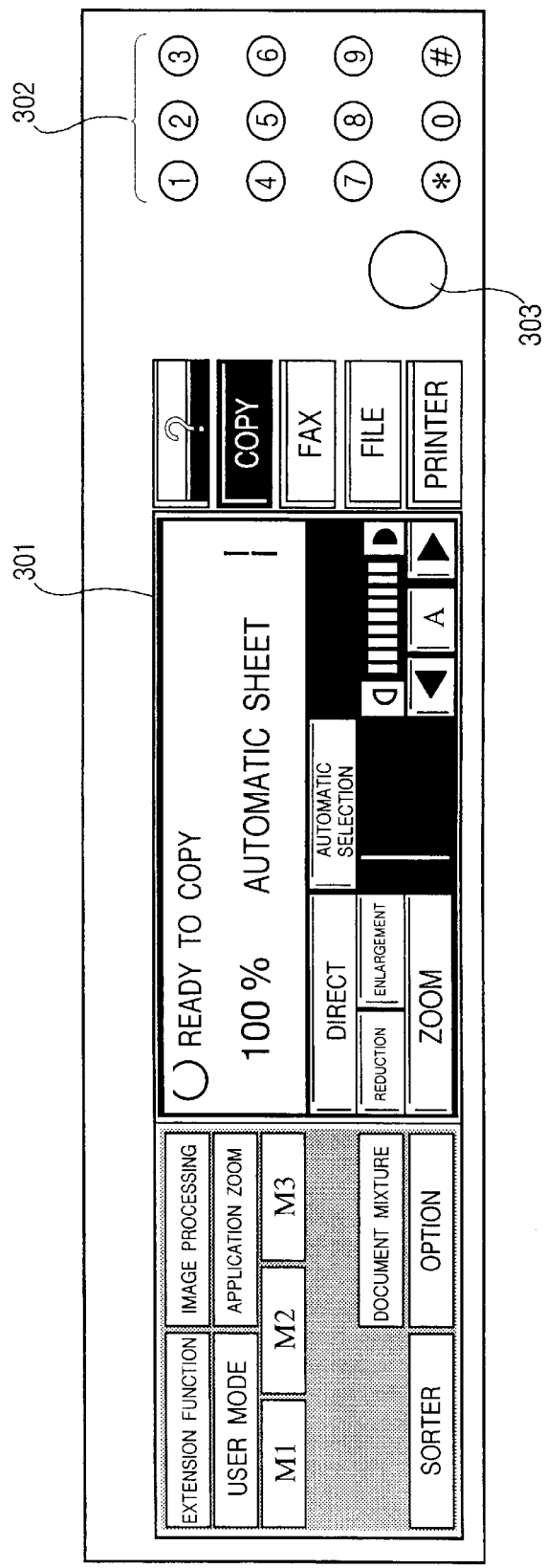
FIG. 3 is a plan view of an operation panel.

FIG. 3 is a plan view showing an example of an operation panel arranged in the reader unit 1 shown in FIG. 1.

In FIG. 3, reference numeral 301 denotes a display unit to display the operating state and a message. A surface of the display unit 301 is a touch panel. The display unit 301 functions as a selection key by touching the surface. Reference numeral 302 denotes a ten-key to input numerals; and 303 a start key. The operation is started by depressing the start key 303.

The functional processing operations in the image forming apparatus of the embodiment will now be described hereinbelow with reference to the flowcharts shown in FIGS. 4 to 10.

FIGS. 4 to 9 are the flowcharts each showing an example of the functional processing procedure in the image forming apparatus of the embodiment. "S1 . . . " in the diagram denotes processing steps.

Figure 4:
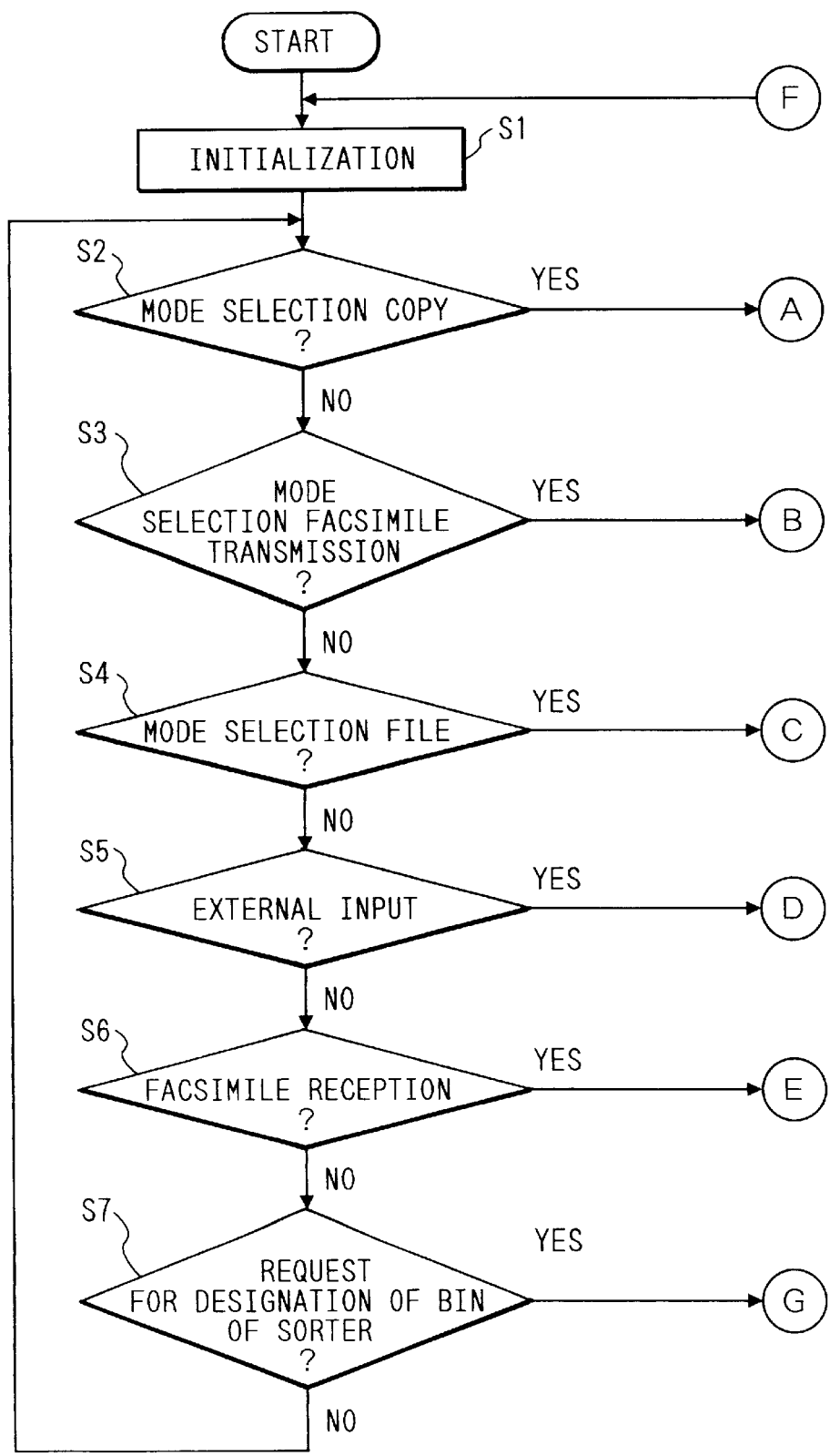
FIG. 4 is a flowchart showing the operation of the embodiment.

After a power source was turned on, an initialization in FIG. 4 is executed (S1). An operating mode selection key is displayed on the display unit 301 of the operation panel. By touching the panel on the selection key, a desired mode is selected. A check is made to see if the selected mode is a copy mode or not (S2). In case of the copy mode, the processing routine advances to S11 in FIG. 5.

When it is judged in S2 that the copy mode is not selected, a check is made to see if a facsimile transmission mode has been selected or not (S3). In case of the facsimile transmission mode, S21 shown in FIG. 6 follows.

When it is judged that the facsimile transmission mode is not selected in S3, a check is made to see if a file mode has been selected or not (S4). In case of the file mode, the processing routine advances to S31 shown in FIG. 7.

When it is judged in S4 that the file mode is not selected, a check is made to see if an input mode from the computer interface unit 7 has been selected or not (S5). When the input mode is selected, the processing routine advances to S41 shown in FIG. 8.

When it is judged in S5 that the input mode is not selected, a check is made to see if a facsimile reception mode has been selected or not (S6). When the facsimile reception mode is selected, the processing routine advances to S51 shown in FIG. 9.

When it is judged in S6 that the facsimile reception mode is not selected, a check is made to see if a request mode for designation of the bin of the sorter 220 has been selected or not (S7). When the request mode for designation of the bin of the sorter 220 is selected, S61 shown in FIG. 10 follows.

When the request mode for designation of the bin of the sorter 220 is not selected in the judgment in S7, the processing routine is returned to S2 and similar processes are repeated.

Figure 5:
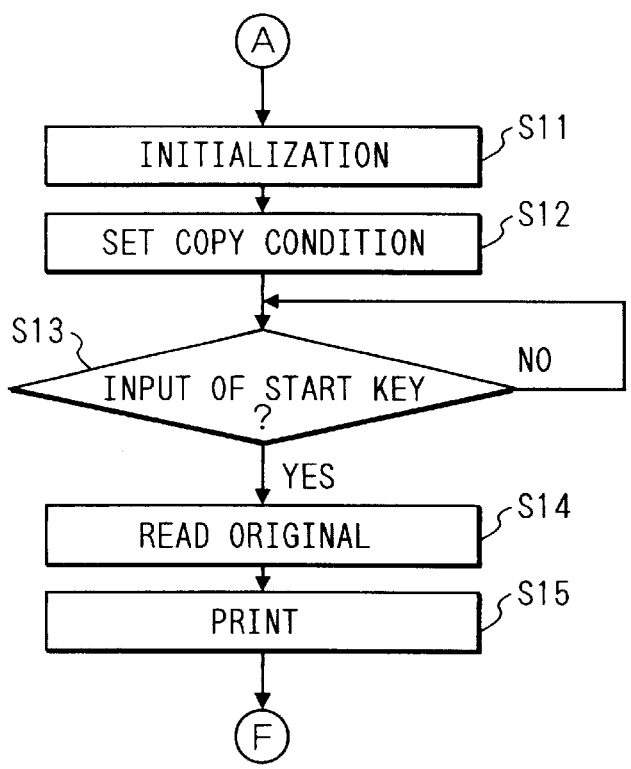
FIG. 5 is a flowchart in a copy mode.

When the copy mode is selected in the judgment in S2 shown in FIG. 4, a flow shown in FIG. 5 is started and an initialization of the copy operation is first executed (S11). A key that is inputted by the operation panel is read and a copy condition is set (S12) and an input of the start key 303 is waited (S13). When the start key 303 is depressed, the original is read out by the reader unit 1 (S14) and is printed by the printer unit 2 (S15). When the printing process is completed, the processing routine is returned to S1 shown in FIG. 4 for initialization.

Figure 6:
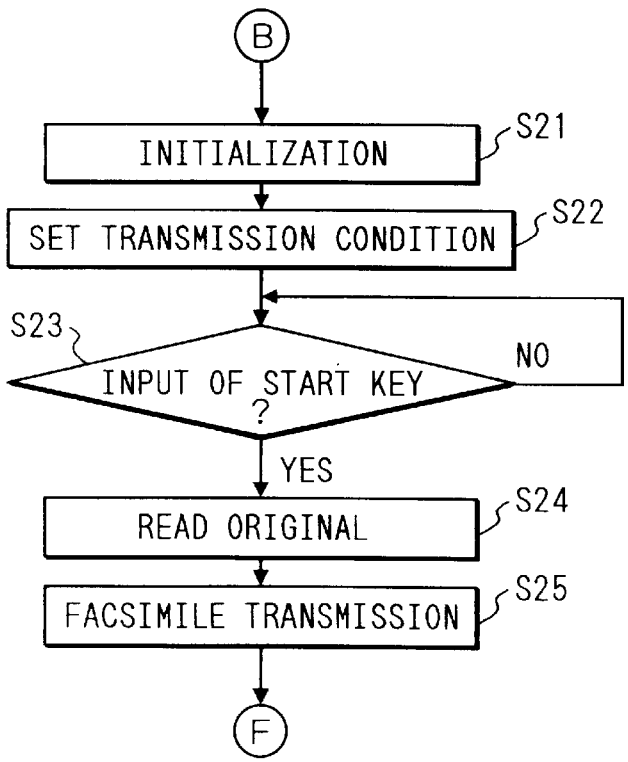
FIG. 6 is a flowchart in a facsimile transmission mode.

Further, in the case where the facsimile transmission mode is selected in the judgment in S3 shown in FIG. 4, a flow shown in FIG. 6 is started and an initialization of the facsimile transmission is first executed (S21). A key that is inputted by the operation panel is read and a facsimile transmission condition is set (S22) and the apparatus waits for an input of the start key 303 (S23).

In the setting of the transmission condition in S22, it is possible to set to which bin of the sorter of a transmission partner the sheet on which the image data to be transmitted was printed is ejected.

When the start key 303 is depressed, the original is read by the reader unit 1 (S24) and the image data is transmitted to the facsimile unit 4. The facsimile unit 4 performs the facsimile transmission in accordance with a set format and a predetermined protocol (S25). After completion of the transmission, the processing routine is returned to S1 shown in FIG. 4.

At the time of an initial communication before the image data is transmitted, information indicating whether the transmission partner has a sorter or not is exchanged. When the partner has the sorter, bin information to designate to which bin of the sorter the sheets are ejected is transmitted.

Figure 7:
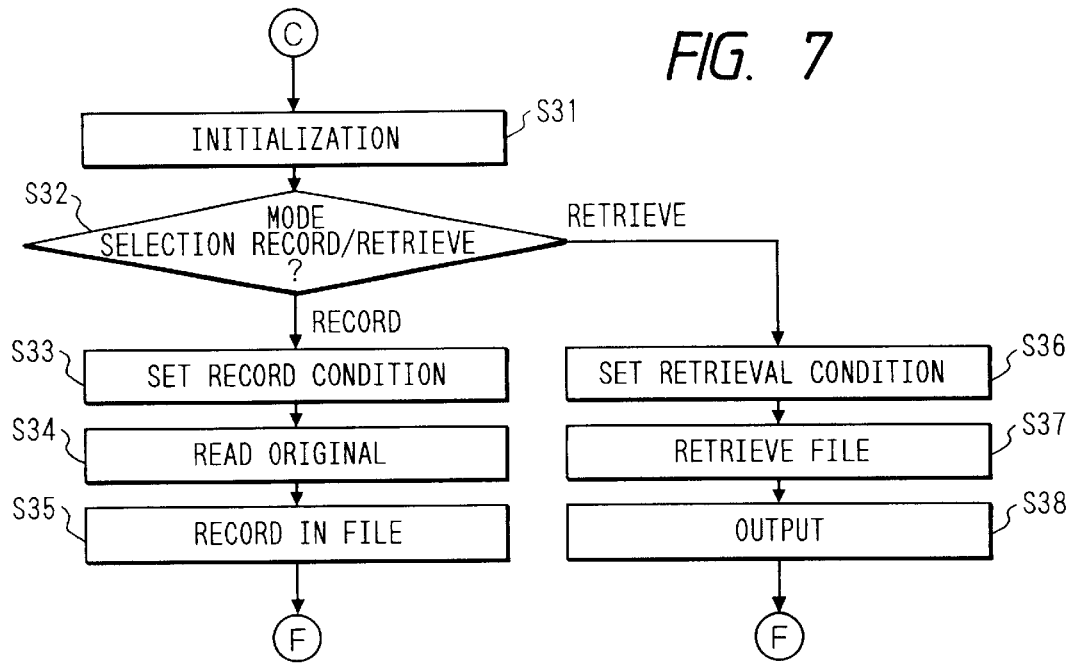
FIG. 7 is a flowchart in a file mode.

In the case where the file mode is selected in the judgment in S4 shown in FIG. 4, a flow shown in FIG. 7 is started and an initialization of a file operation is first executed (S31). A mode selection of a file recording or a file retrieval is displayed on the operation panel and the apparatus waits for a key input from the operator (S32). When the recording key is selected, a recording condition is set (S33), the original is read from the reader unit 1 (S34), the data is transmitted to the file unit 5 and is recorded to the external memory apparatus 6 of the file unit 5 (S35).

When the file retrieval key is selected in S32, a retrieval condition is set (S36), the file is retrieved from the external memory apparatus 6 (S37), and the result is outputted (S38). After completion of the file recording or file retrieval, the processing routine is returned to S1 shown in FIG. 4 for initialization.

Figure 8:
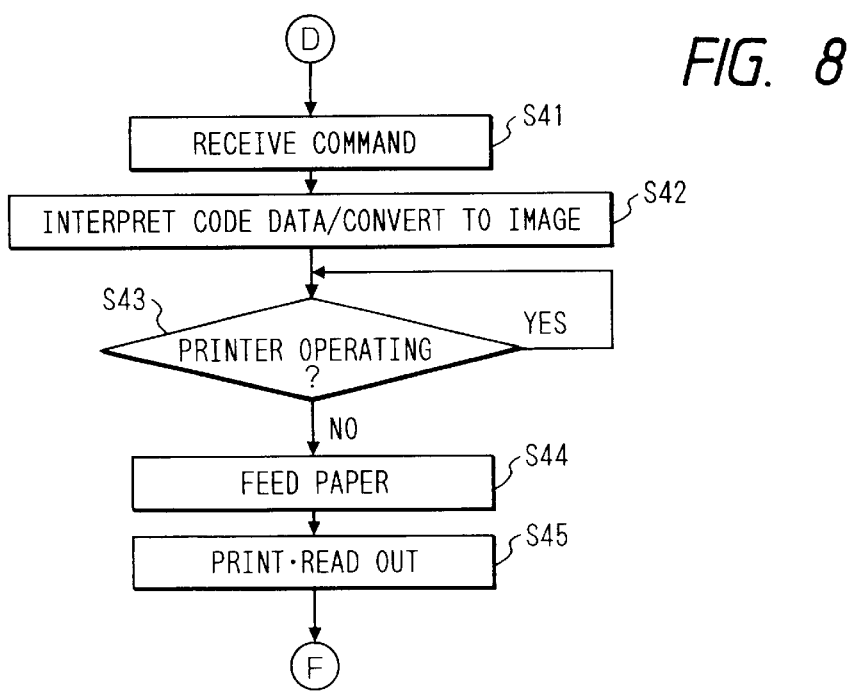
FIG. 8 is a flowchart in a computer input mode.

In the case where command data is inputted from the outside in the judgment in S5 shown in FIG. 4, further, a flow shown in FIG. 8 is started. A command is received by the computer interface unit 7 (S41), the data is transmitted to the formatter unit 8 through the core unit 10 and is interpreted, thereby developing the information on a bit map memory (S42). In a process in S43, a check is made to see if the printer unit 2 is operating or not and the apparatus waits for the end of the operation. After completion of the operation, a proper sheet is selected and a feeding of the sheet is started (S44). The sheet is fed from the sheet stacking units (sheet cassettes) 204 and 205 and are moved to the transfer unit 206. In this instance, the image developed to the bit map memory by the process in S42 is subjected to a rotating process of images by a method, which will be described hereinlater, in accordance with information of the direction, size, and the like of the sheet and is read out. The read out image information is transmitted to the exposure control unit 201 and the foregoing printing process is executed (S45). After the printing was finished and the data was subsequently outputted, the processing routine is returned to S1 shown in FIG. 4 for initialization.

The operation for rotating and reading processings of the image in the embodiment will now be described with reference to FIGS. 11A to 1D. The image developed to the bit map memory by the process in step S42 shown in FIG. 8 is read out as shown in FIGS. 11A to 11D.

In an example of the bit map development in the embodiment, as an example of a size of A4, a bit map of 4622 pixels for 297 mm in the vertical direction and 3296 pixels for 210 mm in the lateral direction is obtained.

Figure 11A:
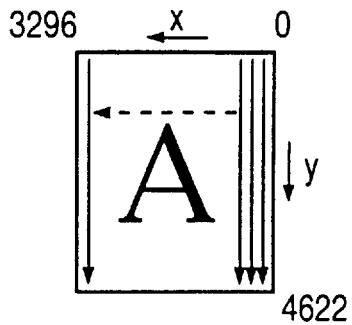
FIGS. 11A to 11D are explanatory diagrams of rotating and reading operations of an image.

When reading out the image without rotating, as shown in FIG. 11A, the rotation control unit of the formatter unit 8 shown in FIG. 1 sequentially reads out in the direction of "0, 0"→"0, 4622"→"1, 0"→"1, 4622".

Figure 11B:
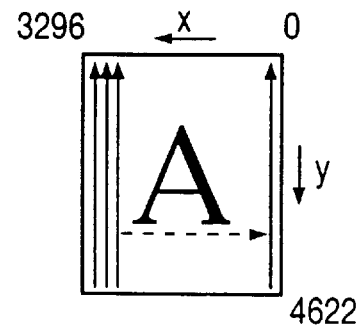

When rotating the image by 180° and reading out, as shown in FIG. 11B, the rotation control unit of the formatter unit 8 shown in FIG. 1 sequentially reads out in the direction of "3296, 4622"→"3296, 0"→"3295, 4622"→"3295, 0" that is opposite to the direction in FIG. 11A.

Figure 11C:
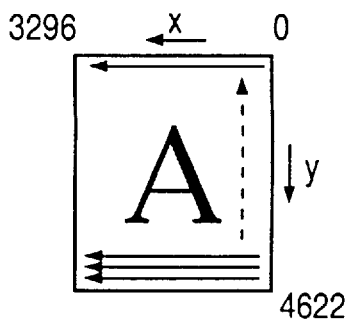
Figure 11D:
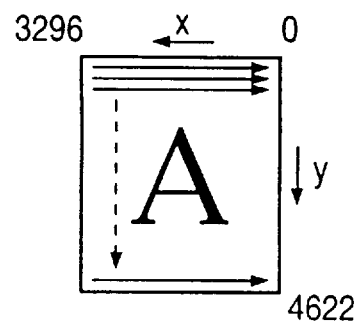

In case of rotating the image by −90° and reading out, as shown in FIG. 11C, the rotation control unit of the formatter unit 8 shown in FIG. 1 exchanges the vertical and lateral directions of the reading direction and sequentially reads out in the direction of "0, 4622"→"3296, 4622"→"0, 4621"→"3296, 4621".

When reading out the image by rotating the reading direction by 90°, as shown in FIG. 1D, the rotation control unit of the formatter unit 8 shown in FIG. 1 exchanges the reading direction in each of the vertical and lateral directions and sequentially reads out the image data in the direction of "3296, 0"→"0, 0"→"3296, 1"→"0, 1".

In addition to the formatter unit 8, each of the image memory unit 9 and reader unit 1 also has such a rotation processing function. The printer unit 2 selects the sheet locating in the direction according to the contents of the rotating process and prints the image to such a sheet.

Figure 9:
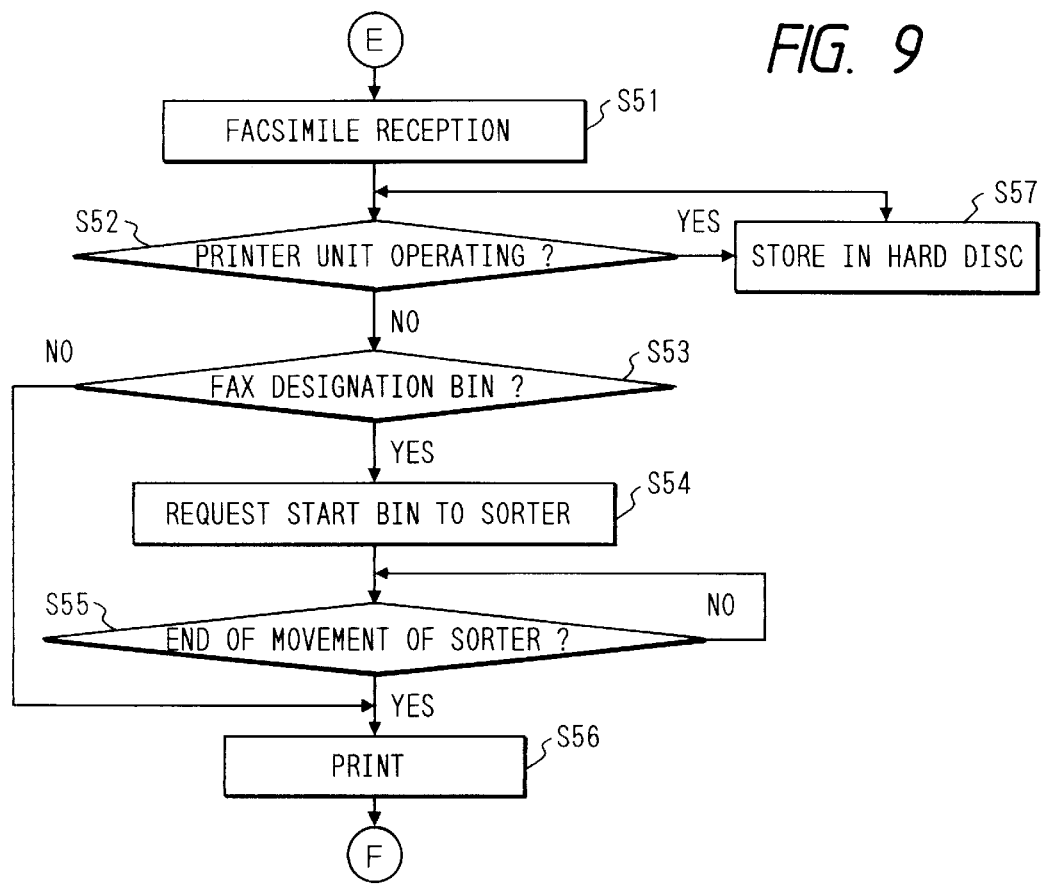
FIG. 9 is a flowchart in a facsimile reception mode.

In the case where the facsimile reception is judged in S6 shown in FIG. 4, a flow shown in FIG. 9 is started. The facsimile reception is first performed by the facsimile unit 4 (S51) and a check is made to see if the printer unit 2 is operating or not (S52). If NO, a check is made to see if there is a request for designation of the bin of the sorter for the facsimile or not (S53). In case of no request for designation of the bin, the data is transmitted to the printer unit 2 and is printed and the printed sheet is ejected to an empty bin or the top bin of the sorter.

When receiving the presence of the request for designation of the bin of the sorter for a facsimile in the judgment in S53, a start bin to eject the facsimile reception data is requested to the sorter 220 (S54) and the apparatus waits for the end of the movement of the sorter 220 (S55). After completion of the movement of the sorter 220, the data is transmitted to the printer unit 2 and is printed.

In the case where it is judged in S52 that the printer unit 2 is operating, the data is stored to a hard disk (HD) of the facsimile unit 4 (S57), when the printer unit 2 is not operating, the data is printed out by the printer unit 2. After completion of the printing, the processing routine is returned to S1 shown in FIG. 4 for initialization.

Figure 10:
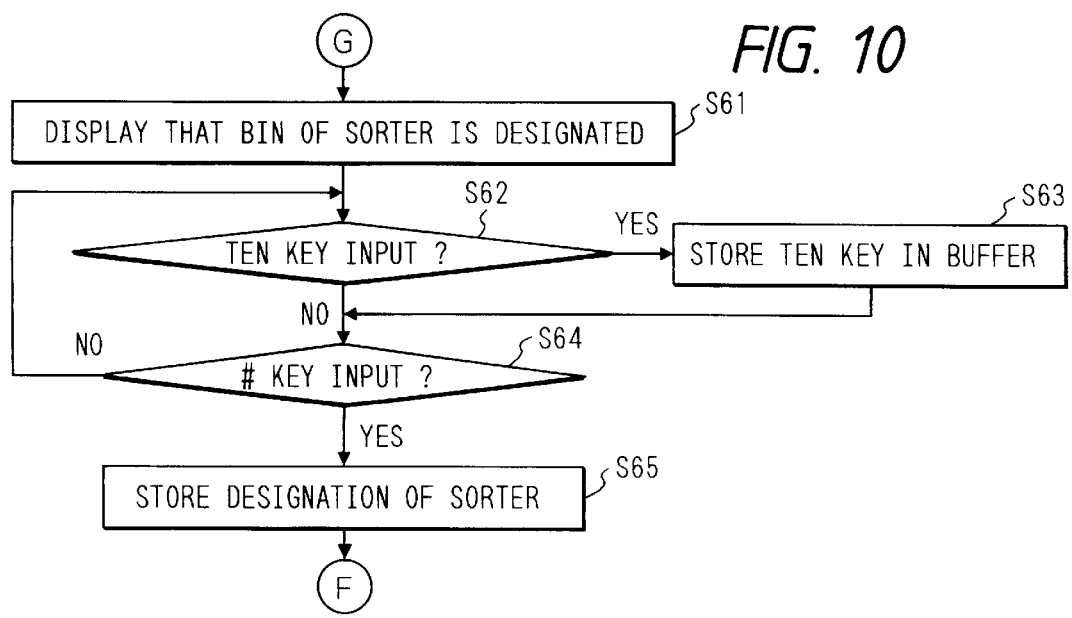
FIG. 10 is a flowchart in a request mode for designation of a bin of a sorter.

In the judgment in S7 shown in FIG. 4, when the request mode for designation of the bin of the sorter is selected, a flow shown in FIG. 10 is started and the designation of the bin of the sorter is displayed to the LCD 301, thereby urging the user to input by the key (S61). After that, a check is made to see if a ten-key input (0 to 9 buttons of 302) has been performed or not (S62). When there is a ten-key input, the input number is stored into a RAM buffer (S63). In case of no ten-key input in the judgment in step S62, a check is made to see if a "#" key input has been performed or not (S64). If NO, the processing routine is returned to the judgment in step S62.

In the case where there is a "#" key input in the judgment in S64, the ten-key input, namely, the input for designation of the bin of the sorter is determined and the bin number is stored into the RAM (S65). The bin can be also designated by not only the operation panel but also a computer connected through the computer interface unit 7 or a facsimile apparatus on the transmission side connected through the facsimile unit 4. The designation of the bin of the sorter can be also made correspond to the receiver or transmitter and to a function of a copying apparatus, a facsimile apparatus, or the like. After completion of the storing process in step S65, the processing routine is returned to S1 shown in FIG. 4.

Each of the above modes is selected by using the selection key of the operation panel, or it is received by the facsimile unit 4, or it is selected in accordance with the detection of a command from the outside by the computer interface unit 7. The operation of the selected mode is executed.

As for such operations, there is an apparatus which can simultaneously execute those operations by combining them or an apparatus which can simultaneously and independently execute them. The setting of the priorities and the like are controlled by the core unit 10.

Figure 12:
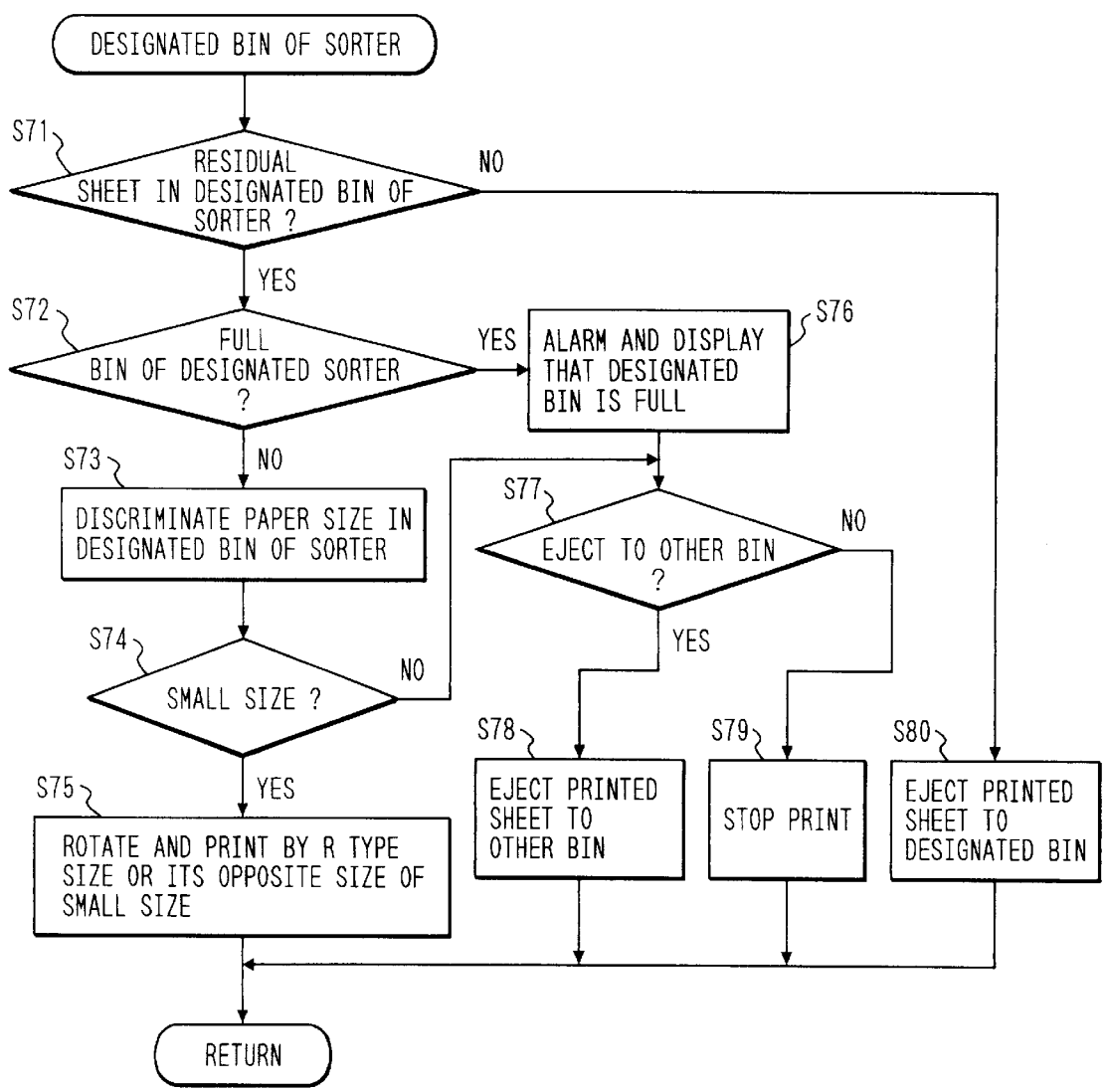
FIG. 12 is a flowchart showing processes corresponding to a state of the designated bin.

A process in a case where other sheets which have already been ejected remain in the designated bin of the sorter or a case where the bin is filled with the ejected sheets will now be described with reference to FIG. 12. The diagram corresponds to processes before S55 in FIG. 9 or the setting of the transmission condition (S22) and the facsimile transmission (S25) in FIG. 6.

Figure 13:
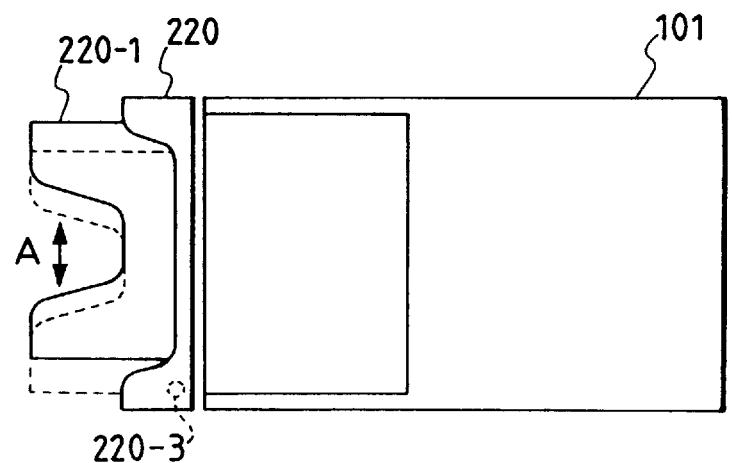
FIG. 13 is a plan view of the sorter in order to explain a shifting operation of the bin.

A check is made to see if the sheets remain in the designated bin of the sorter or not on the basis of the detection result of the sheet detection sensor 220-2 (S71). When the sheets remain, a check is made to see if the designated bin of the sorter is full (a state in which no sheet can be outputted) or not on the basis of the result of the above-mentioned sheet counting (S72). When the designated bin of the sorter is not full, a size of the sheets which have already been stacked in the designated bin of the sorter is discriminated on the basis of the memory contents mentioned above (S73). Subsequently, a check is made to see if the paper size is a small size such as A4, LTR, A5, or the like or not (S74). In case of the small size, the sheet is printed by an R system (to convey the sheet in the longitudinal direction of the sheet) of the small size or an opposite system (to convey the sheet in the short side direction of the sheet) of the small size (S75). In this instance, when the direction of the original image differs from the direction of the printed image, the image is subjected to the rotating process by matching with the direction of the sheet. For example, in the case where the size of the sheets stacked in the sorter is equal to A4 (conveyance in the short side direction), the image rotated by 90° is printed to the sheet of the type of A4R (conveyance in the longitudinal direction). The printed sheet is ejected to the designated bin of the sorter. As shown in FIG. 13, when the bin of the sorter can be shifted in the directions shown by double-headed arrow A, perpendicular to the ejecting direction, the bin is shifted in place of making the direction of the sheet differ every time, so that the bundles of sheets in the same bin are not mixed. After that, the processing routine is returned. The bin is shifted by a motor 220-3.

The apparatus is constructed in a manner such that data indicative of a state (the direction or position of the sheet) of the final ejected sheet in each bin can be stored in the RAM for every bin. On the basis of the stored data, the selection of the sheet or the shift of the bin of the sorter is controlled so as to eject the sheet in a state different from the state of the sheets that have already been ejected to the designated bin. When the control to change the direction of the sheet is performed, the sheets of the A4 size (conveyance in the short side direction) are set in the sheet stacking unit 204 and the sheets of the A4R size (conveyance in the longitudinal direction) are set in the sheet stacking unit 205. The sheet is fed by selecting either one of them.

On the basis of the count result counted every bin, a check is made to see if the designated bin is full or not in S72. When the designated bin of the sorter is full, information indicating that the designated bin is full is displayed as an alarm to the LCD 301. When the designation bin information is transmitted from the facsimile apparatus on the transmission side, information indicative of such a fact is transmitted to the transmission side (S76). After step S76, when it is judged that the sheet size is not the small size in the judgment in step S74, a message indicating whether the sheet is ejected to other bin or not is displayed on the operation panel and the apparatus asks for the user's judgment. When the designation bin information is transmitted from the transmission side, information indicative of such a fact is transmitted to the transmission side and it is also possible to ask for an instruction of the facsimile apparatus on the transmission side (S77). When "eject to another bin" is designated from the user or the transmission side in the judgment in step S77, the sheet is ejected to the other empty bin or top bin (S78), information indicative of such a fact is displayed or transmitted to the transmission side. The processing routine is returned.

In the case where "the sheet is not outputted to other bin" is designated from the operation panel or the transmission side in the judgment in step S77, the printing is stopped (S79) and the processing routine is returned.

When no sheet remains in the designated bin of the sorter in the judgment in S71, the sheet is ejected to the designated bin of the sorter (S80) and the processing routine is returned.

The other alarms of the sorter such as a staple impossible number of sheets and the like are also similarly asked for the user or the transmission destination side, thereby performing corresponding processes.

Although it is assumed to designate one bin in the above embodiment, the invention is not limited to the embodiment and can be also embodied in a form such that a plurality of bins are designated.

For example, the invention can be embodied in a form in which a plurality of bins are designated in accordance with the ascending or descending order of the reception arrival by the facsimile unit.

When the images of a plurality of sheets are ejected, the invention can be embodied in a manner such that a plurality of bins corresponding to the number of sheets, ejection start bin, and subsequent bins are designated.

The designating process of the bins can be executed by any one of the core unit 10 and the printer control unit CONT2. When considering a case where the apparatus is operated without the external apparatus 3, it is preferable to embody the invention so as to process by the printer control unit CONT2.

The invention can be embodied in a form to staple by sheet post-processing means. In such a case, the invention can be embodied so as to designate a staple position together with the designation of the bin.

As described above, when the images of the facsimile or the like received by the image communicating means through the communication line are ejected, by using means for designating the bin of a sheet post-processing apparatus, after the image forming apparatus was used as a copying apparatus or a printer, when the sheet-shaped recording medium with the recorded image which was received by the image communicating means is ejected, it is possible to prevent that the ejected sheet is erroneously mixed to the other sheet-shaped recording medium on the bin of the sheet post-processing apparatus. The user can obtain the sheet-shaped recording medium with the recorded image which was received by the image communicating means without making a mistake.

What is Claimed is:

1. An image forming apparatus comprising:

first stacking means in which sheets are stacked in a first direction;

second stacking means in which sheets are stacked in a second direction perpendicular to the first direction;

image forming means for forming an image onto a sheet fed from one of said first and second stacking means;

third stacking means having a plurality of trays for stacking the sheet on which the image was formed by said image forming means; and discriminating means for discriminating a stacking state of a sheet on a corresponding tray of said third stacking means, wherein said image forming means selects a sheet from one of said first and second stacking means in accordance with a result of a discrimination by said discriminating means and forms the image on the sheet fed from the selected stacking means.

2. An apparatus according to claim 1, wherein said discriminating means includes a sensor, provided for each of the trays of said third stacking means, for detecting a sheet stacked in each of the trays.

3. An apparatus according to claim 1, wherein said discriminating means includes a memory for storing information of a direction of a sheet stacked in a corresponding tray of said third stacking means, and said image forming means selects a sheet from one of said first and second stacking means in accordance with information of the direction of the sheet which is stored in said memory.

4. An apparatus according to claim 1, further comprising:

rotation processing means for rotating the image in accordance with the direction of the sheet that is selected by said image forming means, wherein said image forming means forms the image outputted from said rotation processing means to the sheet.

5. An apparatus according to claim 1, further comprising:

designating means for designating a tray of said third stacking means, wherein said third stacking means stacks the sheet on which the image is formed onto the tray designated by said designating means.

6. An apparatus according to claim 1, wherein said image forming means forms onto the sheet an image outputted from at least one of reader means for reading an image of an original, facsimile means for facsimile receiving an image, file means for reading out an image stored in a memory medium, and interface means for inputting an image that is transferred from a computer.

7. An image forming apparatus comprising:

stacking means having a plurality of trays for stacking a sheet bearing an image formed by the image forming apparatus;

discriminating means for discriminating a stacking state of a sheet on a corresponding tray of said stacking means; and shifting means for shifting a stacking position of the sheet bearing the image, or a tray, in a horizontal direction in accordance with a result of the discrimination of said discriminating means.

8. An apparatus according to claim 7, wherein said discriminating means includes a sensor, provided for each of the trays, for detecting a sheet stacked in a corresponding tray of said stacking means.

9. An apparatus according to claim 7, wherein said discriminating means includes a memory for storing information of a position of a sheet stacked in a corresponding tray of said stacking means, and said shifting means shifts a stacking position of the sheet bearing the image on a corresponding tray in accordance with the information of the position of the sheet stored in said memory.

10. An apparatus according to claim 7, further comprising:

designating means for designating a tray of said stacking means, wherein said stacking means stacks the sheet bearing the image onto the tray designated by said designating means.

11. An apparatus according to claim 7, wherein said image forming apparatus forms onto the sheet an image outputted from at least one of reader means for reading an image of an original, facsimile means for facsimile receiving an image, file means for reading out an image stored in a memory medium, and interface means for inputting an image transferred from a computer.

12. An apparatus according to claim 7, wherein said shifting means shifts said tray from side to side.

* * * * *

UNITED STATES PATENT AND TRADEMARK OFFICE
CERTIFICATE OF CORRECTION

PATENT NO. : 5,822,075
DATED : October 13, 1998
INVENTOR(S) : SATOSHI KANEKO, ET AL.

It is certified that error appears in the above-identified patent and that said Letters Patent is hereby corrected as shown below:

COLUMN 2:

Line 13, "an" should read --a--.

COLUMN 6:

Line 39, "made" should read --made to--.

COLUMN 7:

Line 39, "counted" should read --counted in--.

COLUMN 8:

Line 42, "Claimed" should read --claimed--.

Signed and Sealed this

First Day of June, 1999

Attest:

Q. TODD DICKINSON

Attesting Officer

Acting Commissioner of Patents and Trademarks